United States Patent
Chuang et al.

(10) Patent No.: US 9,798,520 B2
(45) Date of Patent: Oct. 24, 2017

(54) DIVISION OPERATION APPARATUS AND METHOD OF THE SAME

(71) Applicant: Realtek Semiconductor Corporation, Hsinchu (TW)

(72) Inventors: Hung-Chang Chuang, Kaohsiung (TW); Li-Ming Chen, Keelung (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 14 days.

(21) Appl. No.: 15/099,608

(22) Filed: Apr. 15, 2016

(65) Prior Publication Data
US 2017/0185378 A1    Jun. 29, 2017

(30) Foreign Application Priority Data
Dec. 29, 2015 (TW) .............................. 104144246 A

(51) Int. Cl.
*G06F 7/487* (2006.01)
*G06F 7/535* (2006.01)

(52) U.S. Cl.
CPC ............ *G06F 7/4873* (2013.01); *G06F 7/535* (2013.01); *G06F 2207/5354* (2013.01); *G06F 2207/5356* (2013.01)

(58) Field of Classification Search
CPC .... G06F 7/4873; G06F 7/4917; G06F 7/4988; G06F 7/535; G06F 2207/5354; G06F 2207/5356
See application file for complete search history.

(56) References Cited

U.S. PATENT DOCUMENTS

| | | | | |
|---|---|---|---|---|
| 4,718,032 A * | 1/1988 | Irukulla | ................ | G06F 1/0356 708/650 |
| 7,007,058 B1 * | 2/2006 | Kotlov | .................. | G06F 1/0356 708/654 |
| 7,895,256 B2 | 2/2011 | Zombek et al. | | |
| 8,407,274 B2 | 3/2013 | Swartzlander, Jr. et al. | | |
| 8,694,573 B2 | 4/2014 | Bhattacharjee et al. | | |
| 8,819,094 B2 | 8/2014 | Han et al. | | |

(Continued)

OTHER PUBLICATIONS

Gustavo Sutter et al., "Fast Radix 2K Dividers for FPGAs," IEEE, 2009.

(Continued)

*Primary Examiner* — Matthew Sandifer
(74) *Attorney, Agent, or Firm* — CKC & Partners Co., Ltd.

(57) ABSTRACT

A division operation apparatus is provided. The division operation apparatus includes a memory, a non-zero bit detection circuit, a mapping calculation circuit, a look-up circuit, a compensation circuit and a multiplication circuit. The memory stores a divisor look-up table including a plurality of entries. The non-zero bit detection circuit detects a number of a highest non-zero bit of the divisor. The mapping calculation circuit generates a mapped value of the divisor within a range of the divisor look-up table according to a mapping function. The look-up circuit retrieves a corresponding entry having a stored reciprocal according to the mapped value. The compensation circuit generates a compensation value according to the mapping function. The multiplication circuit multiplies a dividend, the stored reciprocal and the compensation value to generate a divided result of the dividend and the divisor.

18 Claims, 3 Drawing Sheets

(56) References Cited

U.S. PATENT DOCUMENTS

| | | | | |
|---|---|---|---|---|
| 2003/0074384 A1* | 4/2003 | Parviainen | ............. | G06F 1/035 708/654 |
| 2012/0066283 A1* | 3/2012 | Cho | ............. | G06F 7/535 708/650 |
| 2015/0100612 A1* | 4/2015 | Lee | ............. | G06F 7/38 708/209 |
| 2015/0378681 A1* | 12/2015 | Burgess | ............. | G06F 7/537 708/209 |

OTHER PUBLICATIONS

Jong-Chul Jeong et al., "A Cost-Effective Pipelined Divider with a Small Lookup Table," IEEE Transactions on Computers, vol. 53, No. 4, Apr. 2004.

Stuart F. Oberman et al., "Division Algorithms and Implementations," IEEE Transactions on Computers, vol. 46, No. 8, Aug. 1997.

Robert E. Goldschmidt, "Applications of Division by Convergence," Massachusetts Institute of Technology, Jun. 1964.

\* cited by examiner

DIVISION OPERATION APPARATUS AND METHOD OF THE SAME

RELATED APPLICATIONS

This application claims priority to Taiwan Application Serial Number 104144246, filed Dec. 29, 2015, which is herein incorporated by reference.

BACKGROUND

Field of Disclosure

The present disclosure relates to an operation apparatus. More particularly, the present disclosure relates to a division operation apparatus and a division operation method.

Description of Related Art

Mathematical operations such as addition, subtraction, multiplication and division are used when various processors perform signal processing. When the mathematical operations are implemented using circuits, the complexity of division is higher than the complexity of other mathematical operations. However, division is widely used in the operations, e.g., normalization and compensation coordinate conversion of the fisheye lens calibration, performed on digital image signals by the image processing module. Even the division only occupies a relative small part of the total operation, the processing time and the hardware area are affected thereby in a certain degree.

Accordingly, what is needed is a division operation apparatus and a division operation method to address the above issues.

SUMMARY

An aspect of the present disclosure is to provide a division operation apparatus. The division operation apparatus includes a memory, a non-zero bit detection circuit, a mapping calculation circuit, a look-up circuit, a compensation circuit and a multiplication circuit. The memory is configured to store a divisor look-up table comprising a plurality of entries. The non-zero bit detection circuit is configured to receive a divisor to detect a number of a highest non-zero bit of the divisor and determine whether the divisor exceeds a range of the divisor look-up table. The mapping calculation circuit is configured to generate a mapped value of the divisor within a range of the divisor look-up table according to a mapping function if the divisor exceeds the range of the divisor look-up table. The look-up circuit is configured to look up the divisor look-up table according to the mapped value to retrieve a corresponding entry having a stored reciprocal. The compensation circuit is configured to generate a compensation value according to the mapping function. The multiplication circuit is configured to multiply a dividend, the stored reciprocal and the compensation value to generate a divided result of the dividend and the divisor.

Another aspect of the present disclosure is to provide a division operation method. The division operation method includes the steps outlined below. A divisor is receiving by a non-zero bit detection circuit to detect a number of a highest non-zero bit of the divisor and determining whether the divisor exceeds a range of a divisor look-up table, wherein the divisor look-up table is stored in a memory and comprises a plurality of entries. A mapped value of the divisor within a range of the divisor look-up table is generated by a mapping calculation circuit according to a mapping function if the divisor exceeds the range of the divisor look-up table. The divisor look-up table is looked up by a look-up circuit according to the mapped value to retrieve a corresponding entry having a stored reciprocal. A compensation value is generated by a compensation circuit according to the mapping function. A dividend, the stored reciprocal and the compensation value are multiplied by a multiplication circuit to generate a divided result of the dividend and the divisor.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
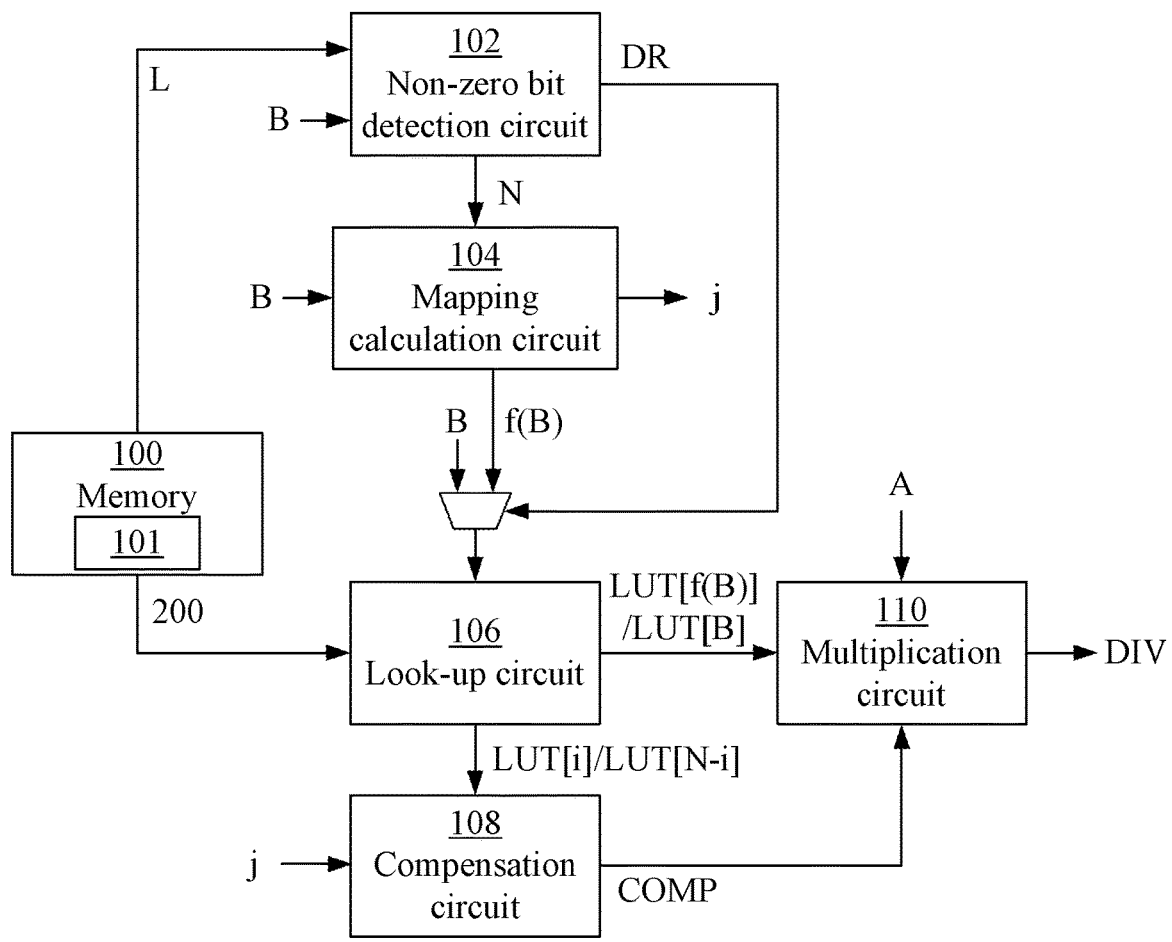
FIG. 1 is a block diagram of a division operation apparatus in an embodiment of the present disclosure.

Reference is now made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a block diagram of a division operation apparatus 1 in an embodiment of the present disclosure. The division operation apparatus 1 includes a memory 100, a non-zero bit detection circuit 102, a mapping calculation circuit 104, a look-up circuit 106, a compensation circuit 108 and a multiplication circuit 110.

By using the components mentioned above, the division operation apparatus 1 can perform division operation on a dividend A and a divisor B to generate a divided result NB. The operation of the division operation apparatus 1 is described in detail in the following paragraphs.

Figure 2:
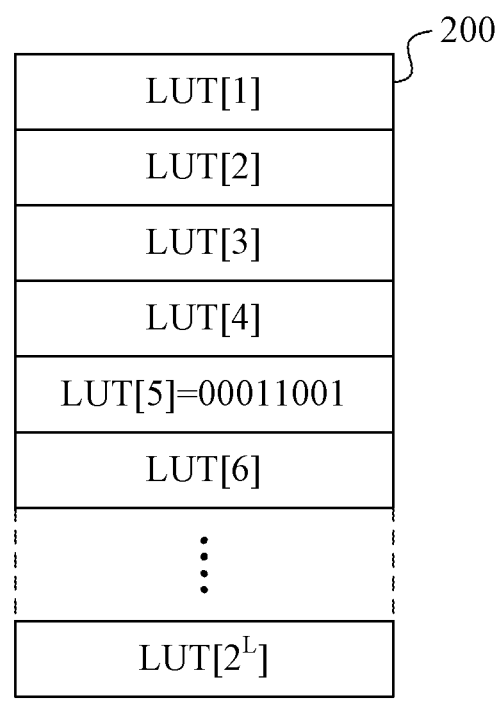
FIG. 2 is a diagram of the divisor look-up table in an embodiment of the present disclosure.

The memory 100 is configured to store a divisor look-up table 101. Reference is now made to FIG. 2 at the same time. FIG. 2 is a diagram of the divisor look-up table 101 in an embodiment of the present disclosure.

In an embodiment, the divisor look-up table 101 includes a plurality of entries 200. In an embodiment, the length of the divisor look-up table 101 described above is $2^L$, in which L is an exponent of length. Each of the entries 200 stores a value corresponding to $1/I$ ($I=1, 2, \ldots$ and $2^1$), which is the reciprocal of I. In the present embodiment, the entries 200 includes the stored reciprocals that are represented by LUT[1], LUT[1], LUT[2], LUT[$2^L$].

In some embodiments, when the divider is 0, the division operation apparatus 1 returns the information of the condition that the divider is 0 without performing the division operation.

In an embodiment, the divisor look-up table 101 stores the data in an integer format, and each of the entries 200 includes the same bit length. For example, the entry 200 that stores the reciprocal LUT[5] includes such as, but not limited to the reciprocal of 5, which is 0.2. As a result, taking the precision of 7 as an example, the reciprocal is represented as 0.0011001 in the binary form. When the bit length of the entry 200 is 8, the reciprocal LUT[5] is represented as 00011001.

The non-zero bit detection circuit 102 receives the divisor B to detect a number of a highest non-zero bit of the divisor B, and to further determine whether the divisor B exceeds a range of the divisor look-up table 101 so as to generate a determination result DR.

Taking the divisor look-up table 101 having the length of $2^L$ as an example, when L is 4, which means that the length of the divisor look-up table 101 is 16, the non-zero bit detection circuit 102 determines that the divisor B does not exceed the range of the divisor look-up table 101 under the condition that the divisor is 5.

Under such a condition, the look-up circuit 106 receives the determination result DR, selects the divisor B and looks up the divisor look-up table 101 accordingly to retrieve the entry 200 corresponding to the divisor B, such as the entry 200 corresponding to the stored reciprocal LUT[5] (i.e., the reciprocal corresponding to ⅕). In an embodiment, the entries 200 of the divisor look-up table 101 mentioned above are arranged in a specific rule such that the precision thereof can be determined by the look-up circuit 106 according to the location of the entries 200 without being stored in the divisor look-up table 101. In another embodiment, the precision can be stored in the entries 200 along with the stored reciprocal such that the look-up circuit 106 determines the actual value of the stored reciprocal according to the precision.

Subsequently, the multiplication circuit 110 further multiplies the dividend A and the stored reciprocal LUT[5] to generate the divided result DIV of the dividend A and the divisor B. In other words, the divided result DIV of the dividend A and the divisor B can be expressed as:

$$A \times \text{LUT}[B]$$

On the other hand, under the condition that the length of the divisor look-up table 101 is 16, when the divisor B is 23, the non-zero bit detection circuit 102 determines that the divisor B exceeds the range of the divisor look-up table 101.

Under such a condition, the mapping calculation circuit 104 generates a mapped value f(B) of the divisor B within the range of the divisor look-up table 101 according to a mapping function.

In an embodiment, the mapping function makes the divisor B multiplied by a first parameter $2^j$ and further divided by a second parameter $2^N$ to generate the mapped value f(B), in which j is a first exponent for the first parameter, and N is a second exponent for the second parameter. In other words, the mapping function can generate the mapped value f(B) by the following equation:

$$f(B) = (B \times 2^j)/2^N$$

The second parameter $2^N$ is larger than the first parameter $2^j$, and the first parameter $2^j$ and the second parameter $2^N$ are both an exponent of 2. More specifically, j and N are both integers larger than or equal to 0, in which N>j.

In other embodiments, the second parameter $2^N$ may also be smaller than the first parameter $2^j$. More specifically, j and N are both integers larger than or equal to 0, in which N<j. For example, the range corresponding to the divisor look-up table 101 can be 5~10. If the divisor is 3, N has to be smaller than j such that f(B) is within the range of the divisor look-up table 101.

In an embodiment, N is the number of the highest non-zero bit of the divisor B, and j may be different values selected according to practical requirements. For example, when the divisor is 23, the binary expression of the divisor is 10111. As a result, the number N of the highest non-zero bit of the divisor B is 4 (i.e., the bit corresponding to $2^4$). If j is selected to be 3, the mapping calculation circuit 104 calculates the value of the following equation based on the mapping function:

$$f(23) = (23 \times 2^3)/2^4 = (23 \times 8)/16$$

In an embodiment, the mapping calculation circuit 104 performs calculation by using a round down method. Thus, the mapped value f(B) becomes 11 according to the mapping function described above. It is appreciated that in other embodiments, the mapping calculation circuit 104 can use such as, but not limited to a half round up method or a round up method to calculate the mapped value f(B).

The look-up circuit 106 receives the determination result DR to select the mapped value f(B), and the look-up circuit 104 looks up the divisor look-up table 101 according to the mapped value f(B) so as to further retrieve the entry 200 corresponding to such a mapped value f(B). Then, the look-up circuit 104 can find out the corresponding store reciprocal LUT[f(B)]. Taking the mapped value f(B) having the value of 11 as an example, the look-up circuit 106 retrieves the entry 200 corresponding to the store reciprocal LUT[11] (i.e., the reciprocal corresponding to ⅟₁₁).

However, after the mapping calculation of the mapping function, the store reciprocal LUT[11] of the entry 200 retrieved by the look-up circuit 106 is not the reciprocal of the original divisor B. As a result, the compensation circuit 108 further generates a compensation value COMP according to the mapping function.

Taking the mapping function mentioned above as an example, the compensation value COMP is generated by multiplying the reciprocal of the second parameter $2^N$ and the first parameter $2^j$. More specifically, the compensation value COMP is generated by the following equation:

$$(1/2^N) \times 2^j$$

In the present embodiment, since the second parameter $2^N$ exceeds the range of the divisor look-up table 101, the compensation circuit 108 factorizes the second parameter $2^N$ into a third parameter $2^i$ and a fourth parameter $2^{N-i}$, in which each of the third parameter $2^i$ and the fourth parameter $2^{N-i}$ is an exponent of 2. More specifically, i is an integer larger than or equal to 1.

The look-up circuit 106 further looks up the divisor look-up table 101 according to the values of the third parameter $2^i$ and the fourth parameter $2^{N-i}$ to retrieve the entries 200 corresponding to the third parameter $2^i$ and the fourth parameter $2^{N-i}$ and find out the corresponding stored reciprocals LUT[$2^i$] and LUT[$2^{N-i}$] to generate the reciprocals of the third parameter $2^i$ and the fourth parameter $2^{N-i}$. For example, if N is 4 and i is selected as 2, the look-up circuit 106 looks up the divisor look-up table 101 according to the values of the third parameter $2^i$ and the fourth parameter $2^{N-i}$ to retrieve the entry 200 of the stored reciprocal LUT[4] (the reciprocal corresponding to ¼).

In some embodiments, i can be a fixed or a non-fixed value.

The compensation circuit 108 generates the value of the reciprocal of the second parameter $2^N$ according to the product of the reciprocals of the third parameter $2^i$ and the fourth parameter $2^{N-i}$. In other words, the compensation value COMP generated by the compensation circuit 108 can be expressed as:

$$(\tfrac{1}{2}^N) \times 2^j = (\tfrac{1}{2}^i) \times (\tfrac{1}{2}^{N-i}) \times 2^j = \text{LUT}(2^i) \times \text{LUT}(2^{N-i}) \times 2^j$$

Subsequently, the multiplication circuit 110 multiplies the dividend A, the stored reciprocal LUT[f(B)] and the compensation value $\text{LUT}(2^i) \times \text{LUT}(2^{N-i}) \times 2^j$ to generate the divided result DIV of the dividend A and the divisor B. In other words, the divided result DIV of the dividend A and the divisor B can be expressed as:

$$A \times \text{LUT}[f(B)] \times \text{LUT}(2^i) \times \text{LUT}(2^{N-i}) \times 2^j$$

As a result, the division operation apparatus 1 of the present disclosure can detect the number of the highest non-zero bit of the divisor B, calculate the compensation value based on the required precision and look up the approximate value of the reciprocal of the divisor based on the divisor look-up table 101 so as to rapidly perform the division operation with low complexity.

It is appreciated that the mapping function described above is merely an example. In other embodiments, the mapping calculation circuit 104 can map the divisor B to the range of the divisor look-up table 101 by using other mapping functions so as to look up the corresponding value and to generate the compensation value COMP according to the corresponding mapping function.

Moreover, the values of the parameters mentioned above are merely an example. In other embodiments, the values of the length $2^L$ of the divisor look-up table 101, the bit length and the precision of the stored entries 200, the number N of the highest non-zero bit of the divisor B and the first parameter $2^j$ and the third parameter $2^i$ can be different based on different conditions and are not limited thereto.

In an embodiment, the memory 100 is further configured to store a reference index (not illustrated) that includes a plurality of factorization relations. The look-up circuit 106 is further configured to look up the reference index according to the mapped value f(B) to retrieve a plurality of the entries 200 corresponding to the mapped value f(B) according to one of the factorization relations. For example, when the mapped value f(B) is 15, such a mapped value can be factorized into 3 and 5. As a result, according to the factorization relation, the look-up circuit 106 can retrieve the entries 200 corresponding to the stored reciprocals LUT[3] and LUT[5] (the reciprocals corresponding to ⅓ and ⅕).

The multiplication circuit 110 multiplies the dividend A, the stored reciprocals LUT[3] and LUT[5] and the related compensation value to generate the divided result DIV of the dividend A and the divisor B. In another example, if the range of the divisor look-up table 101 and the divisor B are 1~8 and 12 respectively, the calculation can be performed according to the entries of the divisor look-up table 101 that correspond to 3 and 4 or the entries of the divisor look-up table 101 that correspond to 2 and 6 since 12 can be factorized into 3×4 or 2×6.

In an embodiment, each of the entries 200 in the divisor look-up table 101 corresponds to a prime number. By incorporating the factorization relations mentioned above, the length of the divisor look-up table 101 can be greatly decreased such that the mapped value f(B) can be generated by a combination of prime numbers.

In yet another embodiment, the entries 200 in the divisor look-up table 101 do not store the reciprocals of the numbers that are the exponents of 2. When the divisor B is an exponent of 2, the multiplication circuit 110 performs a right-shifting of the bits of the dividend A according to the divisor B.

Figure 3:
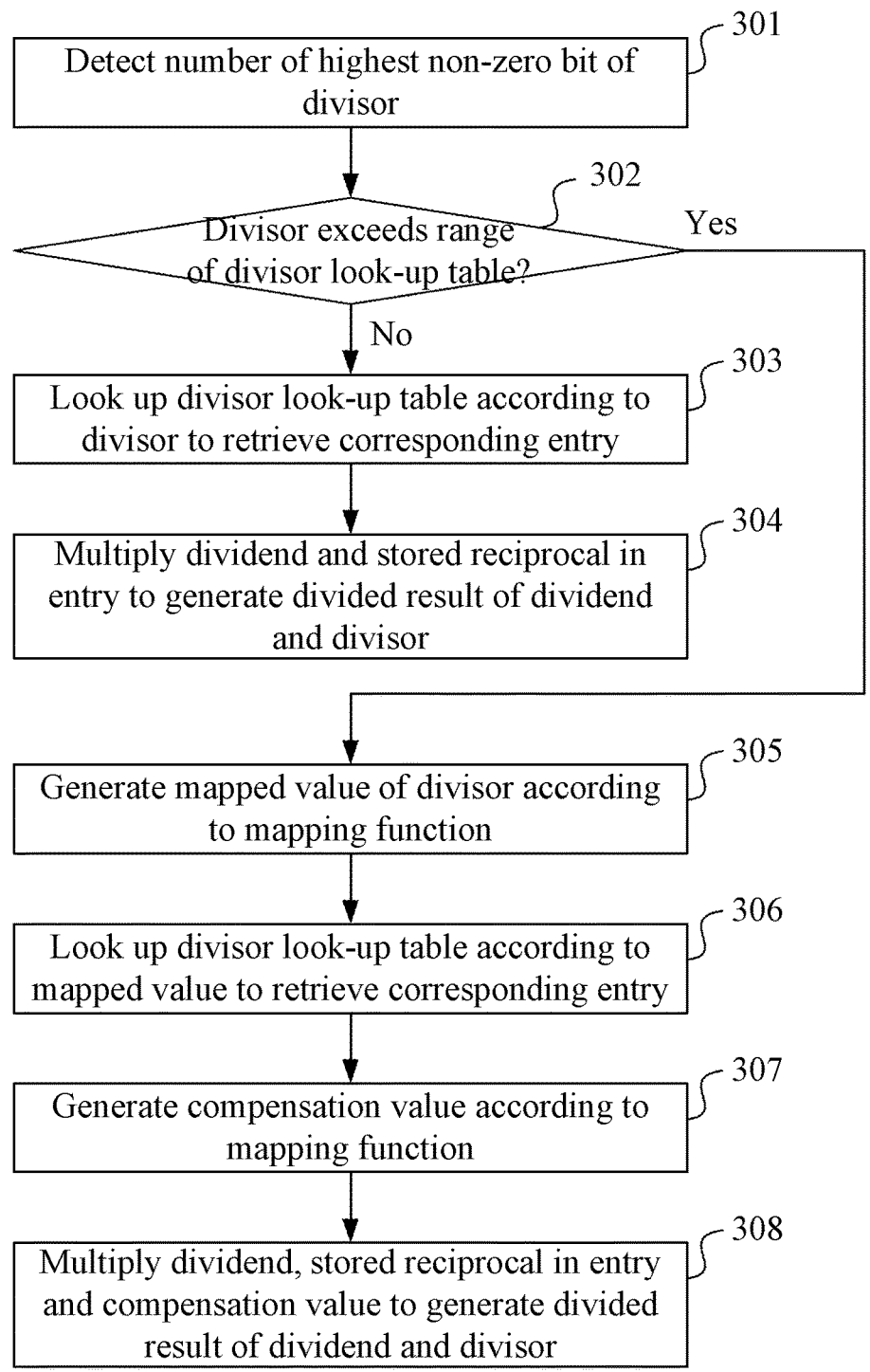
FIG. 3 is a flow chart of a division operation method in an embodiment of the present disclosure.

Reference is now made to FIG. 3. FIG. 3 is a flow chart of a division operation method 300 in an embodiment of the present disclosure. The division operation method 300 can be used in the division operation device 1 illustrated in FIG. 1. The division operation method 300 includes the steps outlined below. (The steps are not recited in the sequence in which the steps are performed. That is, unless the sequence of the steps is expressly indicated, the sequence of the steps is interchangeable, and all or part of the steps may be simultaneously, partially simultaneously or sequentially performed).

In step 301, the divisor B is receiving by the non-zero bit detection circuit 102 to detect the number N of the highest non-zero bit of the divisor B. Further in step 302, whether the divisor B exceeds the range of the divisor look-up table 100 is determined.

When the divisor B does not exceed the range of the divisor look-up table 100, the look-up circuit 106 looks up the divisor look-up table 101 according to the divisor B to retrieve the corresponding entry 200 in step 303.

Subsequently, in step 304, the multiplication circuit 110 multiplies the dividend A and the stored reciprocal LUT[B] in the entry 200 to generate the divided result DIV of the dividend A and the divisor B.

When the divisor B exceeds the range of the divisor look-up table 101, in step 305, the mapping calculation circuit 104 generates the mapped value f(B) of the divisor B within the range of the divisor look-up table 110 according to the mapping function.

In step 306, the look-up circuit 106 looks up the divisor look-up table 100 according to the mapped value f(B) to retrieve the corresponding entry 200.

In step 307, the compensation circuit 108 generates the compensation value COMP according to the mapping function. Taking the mapping function in the embodiment described above, the compensation value COMP is $\text{LUT}(2^i) \times \text{LUT}(2^{N-i}) \times 2^j$.

In step 308, the multiplication circuit 110 multiplies the dividend A, the stored reciprocal LUT[f(B)] and the compensation value $\text{LUT}(2^i) \times \text{LUT}(2^{N-i}) \times 2^j$ to generate the divided result DIV of the dividend A and the divisor B.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A division operation apparatus comprising:
   a memory configured to store a divisor look-up table comprising a plurality of entries;
   a non-zero bit detection circuit configured to generate a determination result signal by receiving a divisor to detect a number of a highest non-zero bit of the divisor and determine whether the divisor exceeds a range of the divisor look-up table based on the detected number;
   a mapping calculation circuit configured to generate a mapped value of the divisor within a range of the divisor look-up table according to a mapping function if the divisor exceeds the range of the divisor look-up table;

a look-up circuit configured to select between the divisor and the mapped value based on the determination result signal and look up the divisor look-up table according to the selected value to retrieve a corresponding entry having a stored reciprocal;

a compensation circuit configured to generate a compensation value according to the mapping function; and a multiplication circuit configured to multiply a dividend, the stored reciprocal and the compensation value to generate a divided result of the dividend and the divisor.

2. The division operation apparatus of claim 1, wherein the mapping function makes the divisor multiplied by a first parameter and further divided by a second parameter to generate the mapped value, wherein each of the first parameter and the second parameter is an exponent of 2.

3. The division operation apparatus of claim 2, wherein the second parameter is N-th power of 2, wherein N is the number of the highest non-zero bit.

4. The division operation apparatus of claim 2, wherein the compensation value is the inverted second parameter multiplied by the first parameter.

5. The division operation apparatus of claim 2, wherein if the second parameter exceeds the range of the divisor look-up table, the compensation circuit factorizes the second parameter to a third parameter and a fourth parameter, the look-up circuit generates reciprocals of the third parameter and the fourth parameter, and the compensation circuit generates the reciprocal corresponding to the second parameter by a product of the reciprocals of the third parameter and of the fourth parameter, in which each of the third parameter and the fourth parameter is an exponent of 2.

6. The division operation apparatus of claim 2, wherein if the second parameter does not exceed the range of the divisor look-up table, the look-up circuit directly looks up the divisor look-up table according to the divisor to retrieve the corresponding entry from the entries of the divisor look-up table, and the multiplication circuit multiplies the dividend and the stored reciprocal of the corresponding entry to generate the divided result of the dividend and the divisor.

7. The division operation apparatus of claim 1, wherein the memory is further configured to store a reference index comprising a plurality of factorization relations;

the look-up circuit is further configured to look up the reference index according to the mapped value to retrieve a plurality of the entries corresponding to the mapped value according to one of the factorization relations; and the multiplication circuit is further configured to multiply the dividend, the stored reciprocal of each of the retrieved entries and the compensation value to generate the divided result of the dividend and the divisor.

8. The division operation apparatus of claim 7, wherein each of the entries of the divisor look-up table corresponds to a prime number.

9. The division operation apparatus of claim 1, wherein if the divisor is an exponent of 2, the multiplication circuit directly right-shifts at least one bit of the dividend according to the divisor.

10. A division operation method comprising:

generating a determination result signal by receiving a divisor by a non-zero bit detection circuit to detect a number of a highest non-zero bit of the divisor and determining whether the divisor exceeds a range of a divisor look-up table based on the detected number, wherein the divisor look-up table is stored in a memory and comprises a plurality of entries;

generating a mapped value of the divisor within a range of the divisor look-up table by a mapping calculation circuit according to a mapping function if the divisor exceeds the range of the divisor look-up table;

selecting between the divisor and the mapped value based on the determination result signal and looking up the divisor look-up table by a look-up circuit according to the selected value to retrieve a corresponding entry having a stored reciprocal;

generating a compensation value by a compensation circuit according to the mapping function; and multiplying a dividend, the stored reciprocal and the compensation value by a multiplication circuit to generate a divided result of the dividend and the divisor.

11. The division operation method of claim 10, further comprising:

making the divisor multiplied by a first parameter and further divided by a second parameter by the mapping function to generate the mapped value, wherein each of the first parameter and the second parameter is an exponent of 2.

12. The division operation method of claim 11, wherein the second parameter is N-th power of 2, wherein N is the number of the highest non-zero bit.

13. The division operation method of claim 11, wherein the compensation value is the inverted second parameter multiplied by the first parameter.

14. The division operation method of claim 13, wherein if the second parameter exceeds the range of the divisor look-up table, the division operation method further comprises:

factorizing the second parameter to a third parameter and a fourth parameter by the compensation circuit; and generating reciprocals of the third parameter and the fourth parameter by the look-up circuit, and generating the reciprocal corresponding to the second parameter by a product of the reciprocals of the third parameter and of the fourth parameter by the compensation circuit, in which each of the third parameter and the fourth parameter is an exponent of 2.

15. The division operation method of claim 11 wherein if the second parameter does not exceed the range of the divisor look-up table, the division operation method further comprises:

directly looking up the divisor look-up table by the look-up circuit according to the divisor to retrieve the corresponding entry from the entries of the divisor look-up table; and multiplying the dividend and the stored reciprocal of the corresponding entry by the multiplication circuit to generate the divided result of the dividend and the divisor.

16. The division operation method of claim 15, wherein each of the entries of the divisor look-up table corresponds to a prime number.

17. The division operation method of claim 10, wherein the memory is further configured to store a reference index comprising a plurality of factorization relations, the division operation method further comprises:

looking up the reference index by the look-up circuit according to the mapped value to retrieve a plurality of the entries corresponding to the value according to one of the factorization relations; and multiplying the dividend, the stored reciprocal of each of the retrieved entries and the compensation value by the multiplication circuit to generate the divided result of the dividend and the divisor.

18. The division operation method of claim 10, wherein if the divisor is an exponent of 2, the division operation method further comprise:
  directly right-shifting at least one bit of the dividend by the multiplication circuit according to the divisor.

* * * * *